April 11, 1950     O. M. BURKHARDT     2,503,612
SELECTOR COCK
Filed Feb. 17, 1943     2 Sheets-Sheet 1
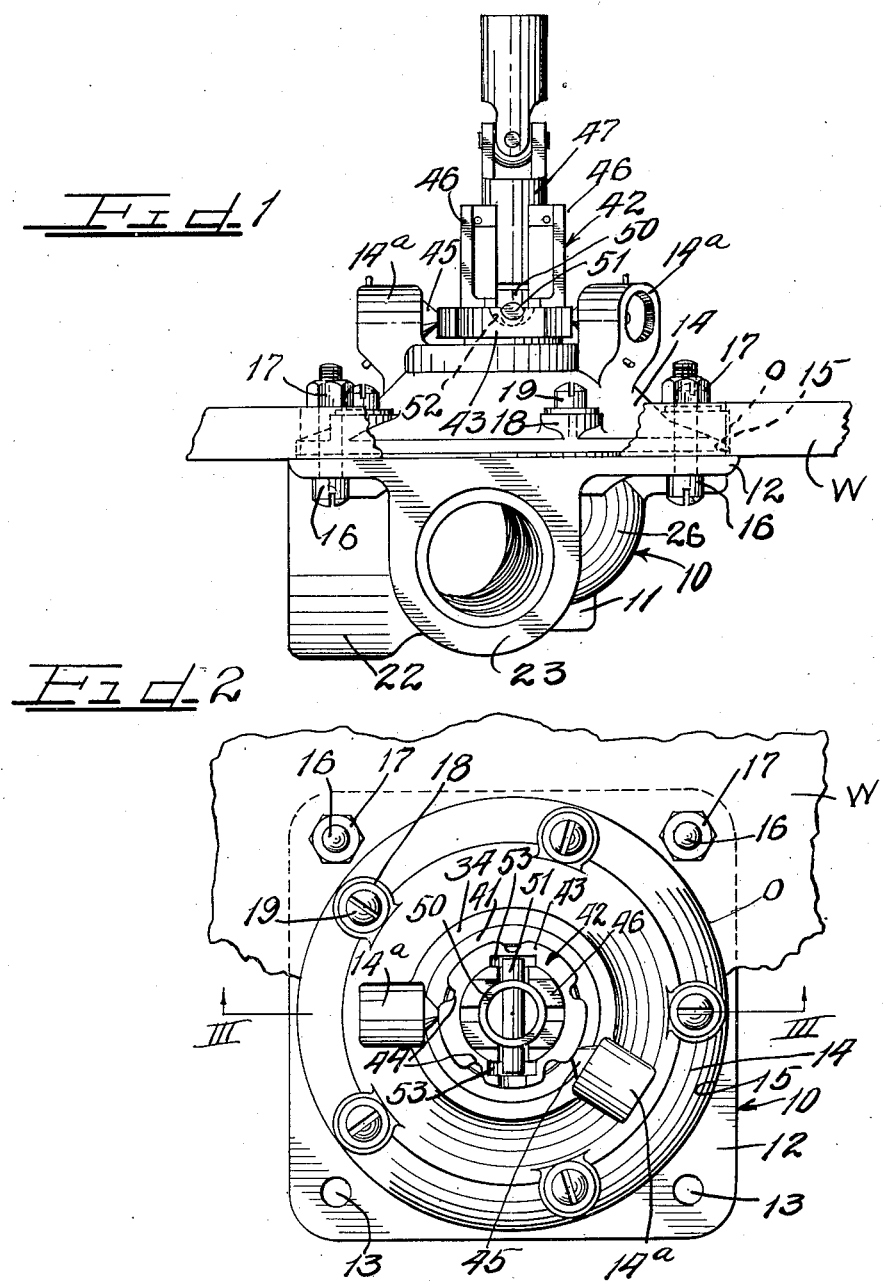
Inventor
Otto M. Burkhardt
by Charles Hill
Attys.

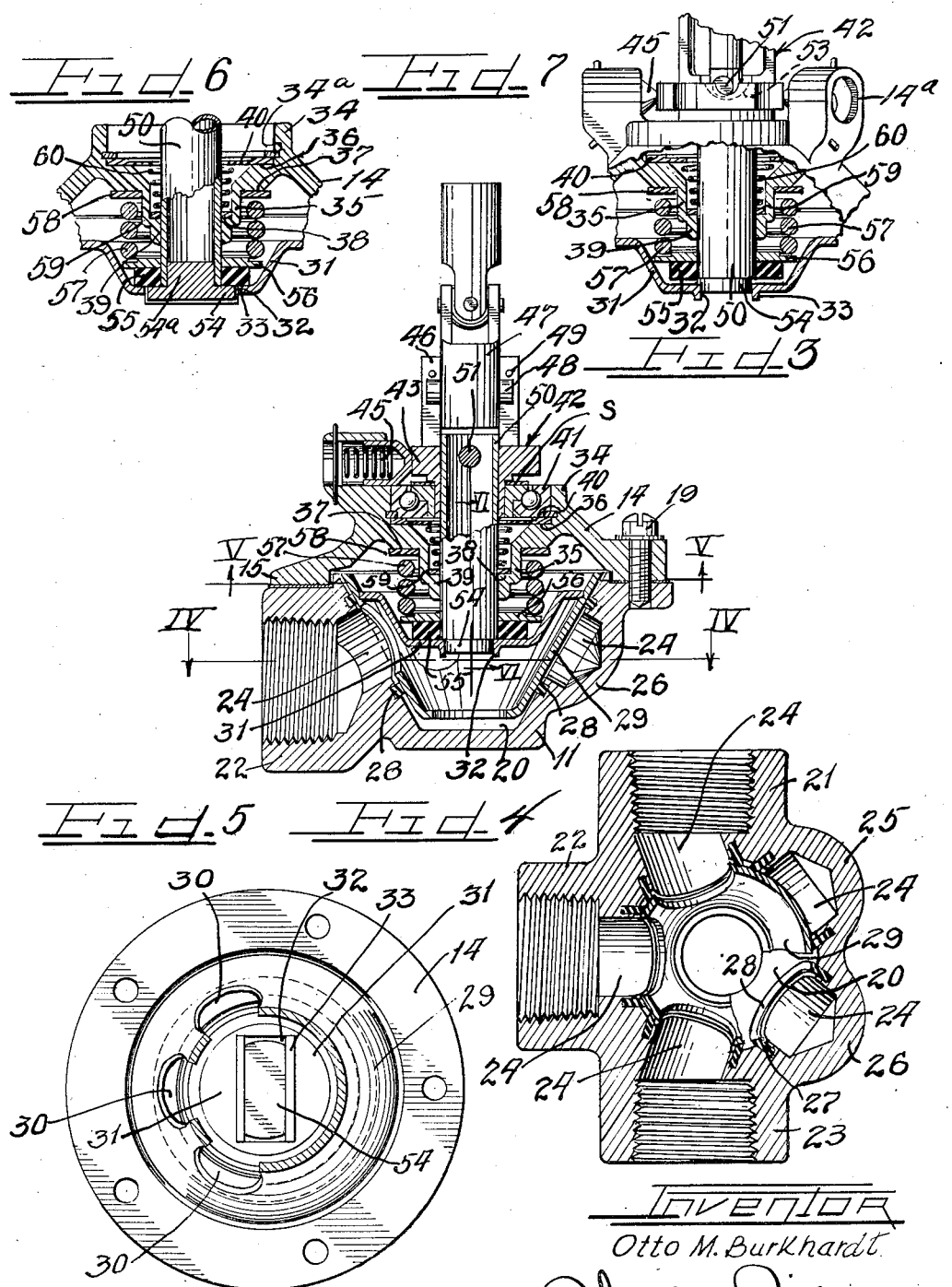

Patented Apr. 11, 1950

2,503,612

UNITED STATES PATENT OFFICE 2,503,612

SELECTOR COCK

Otto M. Burkhardt, Euclid, Ohio, assignor to Thompson Products Inc., Cleveland, Ohio, a corporation of Ohio Application February 17, 1943, Serial No. 476,142

10 Claims. (Cl. 251—97)

1

This invention relates to selector cocks or fluid control valves adapted for controlling the flow of fuel from the various fuel tanks of an airplane to the airplane engine.

Specifically the invention relates to a selector cock or fuel control valve adapted to be mounted directly on an apertured support without the use of mounting brackets and having a rotatable plug part snugly seated on seals disposed at close intervals uniformly around the plug part together with an operating rotatable post mechanism which is so connected to the plug part that side thrusts on the post are not imparted to the plug part.

According to this invention a casing is provided with an outturned mounting flange and a frusto-conical well portion having a plurality of ports disposed symmetrically therearound, in closely spaced relation. All of these ports may not be used and therefore some of them may be blind ports. Seal rings composed of fuel-resisting synthetic rubber such as neoprene are seated in the casing around each port and project into the well. Each seal ring has an end face shaped to lie against a conical surface. A hollow frusto-conical plug is disposed in the well and is symmetrically supported around the periphery thereof on the end faces of the seal rings. This plug has a plurality of apertures therein for the purpose of sealing or connecting lines of flow through the ports in the casing.

The casing has a removable domed cover mounted on the face thereof equipped with the outturned mounting flange. This cover does not overlie the mounting flange and is adapted to project through an aperture in a support on which the mounting flange may be secured. The periphery of the cover acts as a pilot portion to center the casing on the support. With this construction no bracket members are needed to mount the selector cock in position.

A post is rotatably carried in the cover and has a key and slot connection with the plug so that, while the post can rotate the plug, no side thrusts on the post will be imparted to the plug and, in the event of a cocking of the post, the plug will not be cocked.

A yoke member adapted to be connected with a post-operating shaft, pulley or the like is rotatably mounted in the cover and receives the post therein. A pin operatively connects the post and yoke member for co-rotation while allowing dual movement of the post. A spring is maintained under compression between the cover and the post to thrust the end of the post against the

2 plug and cause the plug to be firmly seated on the seal rings.

The yoke member is equipped with cam surfaces cooperating with the pin on the post for relieving the spring pressure against the plug whenever the yoke is rotated to move the plug to a different position. Thus the plug is "cracked" or relieved of its spring load whenever the yoke member is rotated sufficiently to raise the post and is subjected to full spring load whenever the lifting force exerted on the post by the yoke is relieved.

It is, then, an object of this invention to provide a fluid control valve adapted to be directly mounted on an apertured wall or floor without the aid of heretofore-required auxiliary mounting brackets.

A further object of the invention is to provide a fluid control valve having a casing with an outturned mounting flange and a removable cover adapted to project from the casing through an aperture in a support and serve as a pilot for guiding the casing into position on the support.

A still further object of the invention is to provide a selector cock with a rocking joint between the plug and the plug actuator.

A still further object of the invention is to provide a plug-type selector cock wherein the plug is symmetrically supported around its periphery on closely spaced seal rings.

A still further object of the invention is to eliminate side thrusts on the plug of plug type valves.

Another object of the invention is to materially decrease the over-all height of selector cocks.

A still further object of the invention is to provide a fluid-controlled device with an operating yoke mounted in a thrust load carrying antifriction bearing.

Other and further objects of the invention will be apparent to those skilled in the art from the following detailed description of the annexed sheets of drawings which, by way of preferred example only, illustrate one embodiment of the invention.

On the drawings:

Figure 1 is a side elevational view of a selector cock according to this invention directly mounted on an apertured wall and illustrating the manner in which the cover of the selector cock casing projects through the aperture in the wall to serve as a pilot portion for the casing.

Figure 2 is a top plan view of the assembly of Figure 1.

Figure 3 is a vertical cross-sectional view, with parts in elevation, taken along the line III—III of Figure 2.

Figure 4 is a horizontal cross-sectional view, taken along the line IV—IV of Figure 3.

Figure 5 is a horizontal cross-sectional view taken along the line V—V of Figure 3.

Figure 6 is a fragmentary vertical cross-sectional view, with parts in elevation, and with parts omitted, taken along the line VI—VI of Figure 3.

Figure 7 is a fragmentary cross-sectional view, with parts in elevation, similar to the section of Figure 3 but illustrating the position assumed by the parts during a turning of the control post of the device.

As shown on the drawings:

In Figures 1 and 2 the reference numeral 10 designates generally a selector cock according to this invention mounted on a wall such as a floor, panel, or the like W and having a circular opening O therethrough. The selector cock 10 has a metal casing 11 with an outturned flat flange 12 around the upper portion thereof. This flange is square as best shown in Figure 2 and has apertures 13 adjacent the four corners thereof.

A domed cover 14 has a circular periphery 15 seated on the casing 11 within the confines of the flange 12 and leaving the corner portions of the flange fully exposed. This circular peripheral portion 15 of the cover 14 projects into the opening O of the wall W and acts as a pilot portion for centering the flange 12 around the opening O. Bolts 16 extend through the apertures 13 of the flange 12 and through holes provided in the wall W around the circular opening O thereof to receive nuts 17 on their upper ends for securing the selector cock 10 to the wall W.

The cover 14 has upstanding boss portions 18 at spaced intervals therearound receiving cap screws 19 therethrough for securing the cover to the casing 11.

From the above description it will be understood that the selector cock 10 can be directly mounted on a wall or other support without the aid of heretofore required mounting brackets. Since the flange 12 is square, the bolts 16 are equally spaced and since the cover is circular in a circular opening O, the device 10 can be mounted in any one of four positions on the wall W without even changing the bolt holes in the wall.

As shown in Figure 3 the casing 11 has a central frusto-conical well 20 therein with the small end thereof closed by the bottom of the casing and with the large end thereof communicating with the dome portion of the cover 14.

Three bosses 21, 22, and 23, as shown in Figure 4, project outwardly from spaced portions of the casing 11 and are internally threaded to receive fluid flow lines such as pipes or tubes. The interior of each boss 21, 22, and 23 is connected through a port 24 with the well chamber 20 in the casing.

As also shown in Figure 4, the casing 11 has two hollow bulged portions 25 and 26 with the hollow interiors thereof also communicating through ports 24 with the well chamber 20.

Five ports 24 are thus provided around the chamber 20 intermediate the top and bottom thereof and these ports are disposed symmetrically around the chamber in closely spaced relation.

The side wall of the chamber 20 has an annular groove 27 around each port receiving a seal ring 28. The seal ring 28 can be secured in the groove 27 and projects into the chamber 20. Each ring has an end face in the chamber 20 shaped to fit tightly against a conical wall. To insure such a fit the seal rings 28, after being secured in the grooves 27, can have the end faces thereof projecting into the chamber 20 carefully ground by abrasive means.

A hollow open-ended inverted frusto-conical plug 29 is rotatably mounted in the chamber 20 and has a side wall adapted to be fully seated on the seal rings 28. Since five seal rings are provided in closely spaced relation around the well 20, the plug is fully supported on the seal rings around its entire circumference.

As best shown in Figure 5, the plug 29 has three openings or ports 30 in the side wall thereof adapted to join any one of the ports 24 with the interior of the plug. The ports 30 are so arranged in the plug 29 that all three bosses 21, 22, and 23 can be placed in communication, any two of the bosses can be placed in communication to the exclusion of the third boss, and any or all of the bosses can be closed against fluid flow.

A cup member 31 is disposed in the plug 29 and is secured around the periphery thereof to the upper end of the plug as best shown in Figure 3. This cup 31, as best shown in Figure 5, has a rectangular slot 32 in the bottom wall thereof bounded by turned-down flanges 33 along the long sides thereof, for a purpose to be more fully hereinafter described.

As best shown in Figures 3 and 6 the cover 14 has an upstanding circular collar 34 on top of the dome thereof together with a stepped skirt portion 35 depending into the casing 11 from the collar 34. This skirt 35 provides a flat internal shoulder 36 at the bottom of the collar 34, a flat external shoulder 37 in spaced relation beneath the shoulder 36, a second internal shoulder 38 beneath the shoulder 37 and a circular bearing portion 39 at the bottom end thereof.

A metal washer 40 is seated on the shoulder 36 and a thrust load-carrying anti-friction bearing 41 is seated in the collar 34 on the washer 40. The outer race ring of the bearing 41 can have a recess therein cooperating with the groove 34a around the interior of the collar 34 to receive locking segments for holding the washer 40 in the collar. A yoke member 42 has a hollow shank pressed into the inner race ring of the bearing 41. The yoke member 42 has an annular flange 43 overlying the bearing 41 and equipped with a plurality of notches 44 at spaced intervals around the periphery thereof as best shown in Figure 2. Bosses 14a project up from the cover 14 and receive spring-pressed plungers 45 which are urged against the periphery of the flange 43 and into the notches 44 thereof to act as position finders for the yoke member 42.

The flange 43 can be bottomed directly on the inner race ring of the bearing 41 or on shims such as S positioned between the flange and race ring.

This yoke member 42 has four spaced fingers 46 projecting above the flange 43 and defining a socket for a universal coupling 47. This coupling 47 as shown in Figure 3 has a pin 48 projecting between the fingers so that, when the coupling is rotated, the yoke member 42 will also be rotated. Cotter pins such as 49 can extend through the fingers 46 above the pin 48 for holding the coupling on the yoke member.

A hollow post 50 is slidably mounted in the yoke 42 and has a pin 51 therethrough near the upper end thereof extending through the spaces between the fingers 46 at right angles to the pin 48 of the coupling 47. The pin 51 overlies the flange portion 43 of the yoke 42 and the ends of the pin are seated in wells 53 formed in the top face of the flange 43. These wells have concave bottom walls providing cam surfaces which raise the pin and post when the yoke member 42 is rotated, for a purpose to be more fully hereinafter described.

As best shown in Figures 3, 6, and 7, the bottom end of the post has a rectangular-shaped key 54 depending therefrom adapted to fit in the rectangular slot 32 of the cup member 31. This key 54, as shown in Figure 6, has a cylindrical lug portion 54a press-fitted into the end of the post. Alternately of course, the post could be in one piece with an integral key end.

A hard, non-metallic washer 55 is disposed around the post and is bottomed on the key 54. This washer 55, as will hereinafter be more fully described, acts as a thrust bearing and can be composed of compressed graphitic material or the like. A metal washer 56 is disposed on top of the thrust washer 55 and bottoms a coil spring 57 held under compression between a metallic washer 58 on the shoulder 37 of the skirt and the retainer 56. This spring 57 urges the post downwardly through the yoke member 42 to an extent limited by the pin 51 and the bottom of the recesses or wells 53. When the pin 51 is seated in the bottom of the well 53 the thrust bearing washer 55 will act on the cup member 31 to press the plug 29 tightly against all of the seal rings 28. The plug is thus urged into tight sealing engagement with all of the seal rings whenever the yoke member 42 is at rest. However, when the yoke member 42 is rotated sufficiently, the cam surfaces in the bottom of the well 53 will raise the pin 51 thereby raising the post and further compressing the spring 57 as best indicated in Figure 7 to relieve the spring load on the plug 29. Thus the plug is "cracked" or relieved of spring tension so that it can be readily rotated on the seals 28 without sticking to these seals and without damaging the same. When the yoke member 42 is at rest, however, the pin 51 will be urged by the spring 57 into the bottoms of the wells 53 and full spring pressure will be exerted on the thrust bearing 55 to again fully seat the plug 29 against the seals 28.

The post 50, of course, is slidably carried in the yoke member 42 and the yoke member, in turn, is rotatably carried by the thrust bearing 41. The bearing portion 39 of the skirt is spaced a considerable distance beneath the shank portion 43 of the yoke member so that the post is slidably supported in rigid members and side thrusts imported thereto are resisted by the rigid members. Such side thrusts occur through the yoke 42 as when the coupling member 47 is being operated at an angle. The spring plungers 45 also exert a side thrust on the yoke member which in turn is imparted to the post. The post, nevertheless, is so mounted as to resist these side thrusts.

Even though the post is cocked due to side thrusts such cocking action will not be imparted to the plug 29 because the key 54 can rock in the slot 32 to a considerable extent without rocking or tilting the plug. An important feature of this invention resides in the provision of a key and slot connection between the operating post and the plug which will absorb side thrust movements of the operating post to prevent tilting or cocking of the plug. A packing 59 such as a neoprene washer is disposed in the skirt and is bottomed on the shoulder 38 of the skirt. This packing snugly engages the post 50 to prevent leakage out of the casing and cover along the post. A spring 60 held under compression between the seal or packing 59 and the washer 40 constantly urges the packing 59 against the shoulder 38.

From the above descriptions it will be understood that the selector cocks or fluid control valves of this invention are adapted to be directly mounted on a supporting member around an aperture therein without the aid of heretofore necessary mounting brackets. The plug of the device is firmly seated at closely spaced intervals on a plurality of seal rings and some of these seal rings are disposed around blind ports so that the plug will be uniformly supported around its entire circumference. A joint connection between the operating post and the plug is provided to prevent cocking of the plug to a considerable extent even though the operating post is cocked or tilted due to side thrusts imposed thereon.

The post is shiftable longitudinally by cam and pin means which automatically relieve spring pressure on the plug whenever the post is rotated to move the plug. This relief of spring pressure materially increases the wearing life of the seal rings. The device has a domed cover with an internal depending skirt serving as a bearing for the post as well as a packing seat, and a spring centering device. The arrangement of the skirt inside of the cover materially decreases the overall height of the device so that it can be mounted in a very small space. In addition, the cup member 31 by having a depressed bottom extending into the plug 29 provides an added space under the dome of the cover accommodating the lower end of the skirt 35, the plain thrust bearing or washer 55 and the spring assembly, thereby making possible the use of a lower dome on the cover and also contributing to decrease the overall height of the device. A very compact selector cock is thus provided.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a fluid-control device, a casing having an outturned casing mounting flange therearound adapted to be seated on a support member, and a cover for said casing seated on said casing mounting flange but terminating inwardly of said flange, said cover projecting away from said casing and adapted to fit in an aperture of the support on which the casing is mounted for centering the device on the support.

2. In a fluid control device, a casing having a substantially square end pad projecting laterally therefrom and providing a flat end face, a circular cover mounted on said end face and terminating inwardly from the corners of the square pad to leave said corners exposed, said corners of the pad having apertures therethrough adapted to receive mounting means and said circular periphery of the cover extending above the flat face of the pad to act as a pilot for insertion into an aperture in a mounting means adapted to receive the pad thereagainst.

3. A fluid flow control device comprising a casing having an outturned mounting flange at one end thereof providing a substantially flat end face, a domed cover on said end face terminating inwardly of the mounting flange to expose portions of the mounting flange, said cover projecting away from the mounting flange to provide a pilot portion adapted to seat in the aperture of a support member on which the mounting flange can be seated, said dome of the cover having an inwardly depending integral hollow skirt portion, and an operating post rotatably mounted in said skirt portion and projecting slightly above the cover whereby the over-all height of the device is materially reduced by the internal depending skirt portion of the cover.

4. In a fluid flow control device, a casing having a frusto-conical well portion, a frusto-conical plug rotatable in said well portion having an end wall at a level intermediate the ends of the plug, a cover for said casing having a hollow boss portion depending into the casing, a post extending through said hollow boss portion and connected to said end wall of the plug to join the plug and post for co-rotation, and a spring surrounding said boss portion thrusting against said end wall of the plug to urge the plug into said well whereby said end wall and said depending boss portion materially decrease the over-all height of the device.

5. In a fluid flow control device, a casing having an operating chamber, a plug valve rotatable in said chamber, a cover for said casing having an internal hollow boss portion extending into the casing and a short upstanding collar on the upper end of the boss portion, an anti-friction bearing seated in said collar, a lifter member mounted in said anti-friction bearing, a post slidably mounted in said lifter member, said boss portion having a bearing surface in spaced relation from the anti-friction bearing receiving said post thereagainst, a key member on the end of said post, said plug valve having a slot receiving said key member, a plain thrust bearing bottomed on said key member, and a spring acting on said thrust bearing to urge the post into the casing and to simultaneously act on the plug member for seating the member in the chamber, said lifter raising said post to raise the plain thrust bearing away from the plug member when the lifter and post are rotated.

6. In a fluid flow control device, a cover member having a hollow integral skirt portion, an anti-friction bearing seated in one end of said skirt portion and the other end of said skirt portion providing an internal plain bearing surface, an operating member seated in said bearing, and a post slidably mounted in said operating member and in said plain bearing of the skirt whereby said anti-friction bearing will resist side thrusts on the operating member and said plain bearing will cooperate with the operating member to prevent cocking of the post due to side thrusts.

7. In a plug-type valve including an operating chamber and a plug rotatably mounted in said chamber, the improvement of a separate operating post for said plug connected with the plug through a lost-motion connection for co-rotation and for preventing side thrusts on the post from tilting the plug, and means automatically shifting the operating post axially without raising the plug or affecting engagement between said post and said plug as the post and plug are rotated.

8. In a plug-type valve having a frusto-conical plug with an end wall, an operating post for said plug, the improvement of key and slot means operatively connecting the plug and post for co-rotation, and means automatically shifting the operating post axially without raising the plug or affecting engagement between said key and said slot as the post and plug are rotated.

9. In a fluid flow control device having a converging operating chamber and a similarly converging plug rotatably mounted therein, the improvement of a rotatably and reciprocably mounted operating shaft for said plug, a thrust bearing on said shaft, means thrusting said bearing against the plug to urge the plug into the chamber in the direction of convergence thereof, and a lifting means for said shaft automatically raising the shaft and bearing to relieve the thrust load on the plug without raising said plug when the shaft and plug are rotated.

10. In a fluid flow control device having a plug valve rotatably mounted in an operating chamber, means exerting an axial thrust load on said plug to seat the plug in the chamber, and means automatically relieving the plug of said axial thrust load without raising said plug when the plug is rotated.

OTTO M. BURKHARDT.

REFERENCES CITED

The following references are of record in the file of this patent:

UNITED STATES PATENTS

| Number | Name | Date |
|---|---|---|
| 35,515 | Gibson | June 10, 1862 |
| 623,640 | Warwick | Apr. 25, 1899 |
| 685,694 | Schamp | Oct. 29, 1901 |
| 998,872 | Cole | July 25, 1911 |
| 1,002,835 | Gorton | Sept. 12, 1911 |
| 1,095,863 | Hess | May 5, 1914 |
| 1,140,038 | Hess | May 13, 1915 |
| 1,211,305 | Fehrenkamp | Jan. 2, 1917 |
| 1,532,272 | Spence | Apr. 7, 1925 |
| 1,604,329 | Wildin | Oct. 26, 1926 |
| 1,791,914 | Tomlinson | Feb. 10, 1931 |
| 1,801,847 | Carder | Apr. 21, 1931 |
| 1,805,668 | Kelley | May 19, 1931 |
| 1,885,202 | Houser | Nov. 1, 1932 |
| 2,065,289 | Pearce | Dec. 22, 1936 |
| 2,114,933 | Nielson | Apr. 19, 1938 |
| 2,226,169 | Koehler | Dec. 24, 1940 |
| 2,233,840 | Koehler | Mar. 4, 1941 |
| 2,297,161 | Newton | Sept. 29, 1942 |
| 2,312,601 | Stillwagon | Mar. 2, 1943 |
| 2,328,857 | Stone | Sept. 7, 1943 |
| 2,405,940 | Burkhardt | Aug. 20, 1946 |
| 2,406,483 | VanEpps | Aug. 27, 1946 |

FOREIGN PATENTS

| Number | Country | Date |
|---|---|---|
| 2,136 | Great Britain | Jan. 27, 1910 |
| 69,396 | Germany | June 27, 1893 |
| 665,650 | Germany | Sept. 30, 1938 |